(12) United States Patent
Arita et al.

(10) Patent No.: US 6,819,407 B2
(45) Date of Patent: Nov. 16, 2004

(54) DISTANCE MEASURING APPARATUS

(75) Inventors: Satoru Arita, Kasugai (JP); Wataru Ishio, Seto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 10/361,801

(22) Filed: Feb. 5, 2003

(65) Prior Publication Data

US 2003/0218919 A1 Nov. 27, 2003

(30) Foreign Application Priority Data

Feb. 8, 2002 (JP) .......................................... 2002-031647
Oct. 18, 2002 (JP) .......................................... 2002-304360

(51) Int. Cl.$^7$ .............................. G01C 3/08; G01C 1/00; B60T 7/16
(52) U.S. Cl. ..................... 356/4.01; 356/141.1; 180/169
(58) Field of Search ............................ 356/4.01–5.15, 356/141.1; 180/167–169

(56) References Cited

U.S. PATENT DOCUMENTS 6,122,040 A * 9/2000 Arita et al. ................. 356/4.01
6,229,597 B1 * 5/2001 Kikuchi ...................... 356/4.01
6,657,705 B2 * 12/2003 Sano et al. ................. 356/4.01

FOREIGN PATENT DOCUMENTS

JP        10-197635        7/1998
JP        2000-275340      10/2000

* cited by examiner

Primary Examiner—Bernarr E. Gregory
Assistant Examiner—Brian Andrea
(74) Attorney, Agent, or Firm—Beyer Weaver & Thomas LLP (57) ABSTRACT

A distance measuring apparatus includes components for transmitting electromagnetic waves such as laser light to scan a detection area, and receiving reflected waves. The detection area is partitioned into standard areas of a fixed width and signals corresponding to waves received from different standard areas are stored separately. Mutually adjacent standard areas are combined to form a single combined area, if the corresponding signals each fail to exceed a specified threshold value, and these signals are cumulatively added. Conditions of a target object, such as its presence and its position, may be judged on the basis of combined areas thus created such that the detection can be made with increased sensitivity although the resolving power is adversely affected. An upper limit may be introduced for the number of standard areas over which cumulative addition of signals may be made. The threshold value may be made variable according to an average of signal values to be used for detection judgment or the noise component, or time-dependent so as to decrease as the delay time until the reflected waves are received increases.

9 Claims, 5 Drawing Sheets

| Distance (m) | Threshold Value (Th) |
|:---:|:---:|
| 0-5 | 200 |
| 5-10 | 75 |
| 10-15 | 33 |
| 15-20 | 19 |
| 20-25 | 12 |
| 25-30 | 8 |
| 30-35 | 6 |
| 35-40 | 5 |
| 40-45 | 4 |
| 45-50 | 3 |
| 50- | 3 |

DISTANCE MEASURING APPARATUS

BACKGROUND OF THE INVENTION

This invention relates to a distance measuring apparatus of the type which may be set on an automobile and uses electromagnetic waves such as laser light to detect the presence of a car in front and to obtain data on its position.

Development of radars (or distance measuring apparatus) to be on an automobile for monitoring the conditions in front has been continuing, including the use of laser light. These apparatus are adapted to transmit electromagnetic waves and to measure the distance to an object in front from the delay time which elapses until reflected waves are received, or to scan an area in front to determine the direction at which a target object of detection is located. If the detection sensitivity of such an apparatus for reflected waves is constant, however, the apparatus may fail to detect an object within its detection area when it is snowing or the weather condition is otherwise adverse, or depending on the surface condition of the target object of detection, such that the intensity of the reflected waves is weakened.

In view of this problem, Japanese Patent Publication Tokkai 10-197635 has disclosed an apparatus comprising means for detecting an adverse weather condition such as rain and snow and adapted to change the transmission condition of laser light such as the speed of its scanning and the frequency of light transmission to adjust the detection time (that is, the duration of time over which received signals are integrated) depending on the weather condition detected by this means such that the detection sensitivity can be improved. As another example, Japanese Patent Publication Tokkai 2000-275340 has disclosed a laser radar adapted to calculate a rate of atmospheric attenuation of reflected waves from a standard target object and to integrate the received signals for a number of times corresponding to this rate of attenuation. Both are adapted to increase the quantity of received signals to be cumulatively added by integration as the weather condition deteriorates and to thereby suppress the noise effect and to improve the sensitivity to maintain the detection capability of the radar under adverse weather conditions.

With these prior art apparatus, either a detector of weather conditions is required or the rate of atmospheric attenuation must be obtained. Thus, the physical structure of the apparatus and the control process become complicated and hence these prior art apparatus are disadvantageous from the points of view of both the cost and the space for installation. An additional disadvantage of these prior art apparatus is that they cannot be adjusted against the surface condition of the target object of detection such as when the surface is stained or dirty. Apparatus disclosed in aforementioned Japanese Patent Publication Tokkai 2000-275340 are particularly disadvantageous because they cannot be used effectively if there is no suitable standard object. In the case of radar device set on an automobile, in particular, the weather conditions are likely to change from one moment to another and a standard object is usually very difficult to set.

SUMMARY OF THE INVENTION

It is therefore an object of this invention to provide a distance measuring apparatus with a simple structure capable of preventing its sensitivity from becoming lowered due to deteriorated weather conditions or the surface condition of the target object of detection without the necessity of detecting the weather conditions.

A distant measuring apparatus embodying this invention may be characterized as comprising what are herein referred to as light-transmitting means, light-receiving means, memory means, area-combining means and judging means. The light-transmitting means is for transmitting electromagnetic waves to scan in a specified scan direction a specified detection area which is partitioned into a plurality of standard areas of a fixed width. The light-receiving means is for receiving reflection of the electromagnetic waves transmitted from the light-transmitting means and reflected by a target object which may be in the detection area. The memory means is for storing signals from the light-receiving means corresponding to individual standard areas. The area-combining means is for carrying out cumulative addition of the signals stored in the memory means corresponding to a set of those standard areas which are mutually adjacent in the scan direction. The result of the cumulative addition is defined as a combined signal associated with a single combined area which is defined as consisting of the set of standard areas if the signals corresponding to these standard areas do not exceed a specified threshold value. Those of the standard areas, the signal from which is not cumulatively added, are each defined as one combined area, the signal therefrom being defined as the combined signal associated with it. The judging means is for judging presence/absence, as well as the position, of a target object based on the combined signals from the combined areas as defined above and obtained by the area-combining means.

In the above, what is referred to as the signal to be stored in the memory means is the data that are received corresponding to each of the standard areas as a result of transmitting and receiving electromagnetic waves once or more times, such as waveform data showing the variations in intensity with time. If transmission and reception take place more than once corresponding to each standard area, the result of the cumulative addition of these more than one signals received within the corresponding standard area is the "signal to be stored." The area-combining and judging means may be comprised of a microcomputer.

If a signal exceeding the threshold value cannot be obtained in a plurality of mutually adjacent standard areas, signals corresponding to them are cumulatively added by the area-combining means according to this invention and these standard areas are combined together to form a single one of what are herein referred to as the combined areas having the result of this cumulative addition as its corresponding signal. Presence or absence of a target object for detection and its position are judged on the basis of these combined areas and their corresponding signals. Thus, in a situation where reflected waves do exist from a target object and the received signals would normally exceed the target value but fail to do so because of the weather condition such as snow or rain and/or the reflecting surface condition of the target object, the aforementioned cumulative addition will be repeated and the signal intensity will increase and the actual detection sensitivity will be improved although the resolving power of detection will diminish accordingly. As a result, deterioration of detection capability of the apparatus due to weather and surface conditions can be prevented. Since environmental conditions such as the rate of atmospheric attenuation need not be separately measured, the apparatus does not become bulky or complex. If the standard areas are made sufficiently narrow, the resolving power can be improved and such an apparatus installed on an automobile may be able to detect the traffic lane in which the car in front is traveling or even the type of such a car in front.

According to a preferred embodiment of the invention, the area-combining means will operate such that, if neither the result of cumulative addition of signals corresponding to a set of mutually adjacent standard areas nor the signal from the next one of the standard areas after this set of standard areas in the scan direction exceeds the threshold value, cumulative addition will be repeated by including the signal from the next standard area and the next standard area will be included together in the single combined area corresponding to the set of standard areas. In this manner, the number of standard areas combined in a single combined area may be sequentially increased.

For example, if the signal corresponding to one standard area exceeds the threshold value, this signal is defined as the signal corresponding to one combined area (although this "one combined area" consists of only one standard area). If the signal corresponding to a certain standard area does not exceed the threshold value but the signal from the next standard area in the scan direction does, these two signals are treated as signals corresponding to two different combined areas. If each of the signals corresponding to two mutually adjacent standard areas fails to exceed the threshold value, these two signals are cumulatively added and this added result is defined as the signal corresponding to a single combined area consisting of these two mutually adjacent standard areas. If this added result still fails to exceed the threshold value and the signal corresponding to the next (third) standard area also fails to exceed the threshold value, the signals corresponding to all these three standard areas are cumulatively added this added result is treated as the signal corresponding to a newly formed single combined area consisting of all these three mutually adjacent standard areas. This process is continued sequentially as long the signal corresponding to the newly created combined area fails to exceed the threshold value.

In this manner, the number of standard areas that are combined increases continuously according to the degree of adverse weather or other circumstantial conditions and hence the actual detection sensitivity varies in small steps. Thus, an optimal sensitivity level (or the lowest sensitivity level necessary for each given condition) can be attained automatically according to this invention.

In the above, a certain upper limit number may be preliminarily defined such that, if the cumulative addition is repeated and the number of standard areas combined in the cumulative addition reaches this specified upper limit number but if the signal corresponding to the combined standard areas does not exceed the threshold value, the cumulative addition process is stopped there and this upper limit number of combined standard areas is defined as one combined area. In this manner, it can be prevented to keep repeating the cumulative addition process senselessly over an unreasonably large number of times and to thereby introduce a judgment error.

According to another preferable embodiment of the invention, the judgment means is programmed so as to invalidate its own judgment result corresponding to a combined area if the size of the target object in the scan direction estimated from the width of the combined area is considered abnormally large although the signal corresponding to this combined area exceeds the threshold value, judging that the target object is not in the corresponding combined area. In this manner, only the judgment results corresponding to the combined areas having widths that may be considered reasonable (that is, not unreasonably or abnormally large) in view of the estimated size of the target object for detection, are considered valid and those corresponding to combined areas with unreasonably large widths are invalidated. In this manner, it can be avoided to erroneously conclude that the target object is present as a result of repeating the cumulative addition of signals over an unreasonably large number of standard areas.

If the transmission of the electromagnetic waves is carried out by changing the direction of transmission (that is, with a rotary motion of the light source), the detection area increases radially with the distance. Thus, the estimated size of a target object corresponding to a combined area depends not only on the width of the combined area but also on the distance to the target object.

The judgment means according to a further preferable embodiment of the invention may be programmed to validate its judgment result corresponding to a combined area in such a situation if time rate change of the estimated size and/or position of the target object obtained by the judgment means remains smaller than a specified maximum value over a specified length of time, although the judgment result will be invalidated if otherwise. This embodiment is preferable because even a distant target object with poor reflectivity can be correctly detected although it may be detected as having an unreasonably large width. In other words, there are situations where a proper target object may appear to the measuring apparatus as having an unreasonably large width and the invention can serve to detect such a target object correctly by identifying it as a target object.

To explain such situations more in detail, the beam profile of the transmitted electromagnetic waves is usually a Gaussian curve. If the standard areas are set so as to have a fixed width of 1°, this width is set so as to include the parts of the curve with intensity greater than 50% of its peak value. In other words, the area width represents a range with sensitivity above a certain level and there is some degree of sensitivity outside this range. Thus, reflected waves from a target object are also being received to a certain extent also in outside areas and although there is only one target object, its width may be estimated also from these outside areas. Let us assume that the target object is an automobile in front at a distance of 100 m. If the combined area including such outside areas subtends an angle of 3°, the estimated width of the target object will be 5.2 m (100 m×tan 3°) which is much greater than the width of an ordinary automobile (that is, 1.5 m–2.5 m). In other words, there are probably many situations where the estimated width of the target object may be unreasonably large but it actually represents the width of one automobile.

According to this embodiment of the invention, misjudgments in such situations can be avoided. If a target object appears to have an unreasonably large width because this target object actually represents two automobiles or a combination of an automobile and a reflecting roadside object, they will be separated soon and they will quickly cease to be detected as one combined target object. If the target object is a single automobile although appearing to have an unreasonably large width, however, it will continue to appear as one single object over a significant length of time. In the above, "time rate of change" may mean, if measurements are taken periodically, the difference between results of measurements at one time and at the next time.

In any of the embodiments of the invention described above, the threshold value may be set according to a time average of signals on which the judging means makes a detection judgment, or according to signals received while the electromagnetic waves are not being transmitted. In this manner, the threshold value changes according to an average signal value or the noise level, and this can significantly decrease the possibilities of a detection error due to noise under adverse environmental conditions or an increase of the noise component due to an increased number of times the cumulative addition is repeated. The threshold value may be made time-dependent and to decrease as the delay time until the electromagnetic waves are received by the light-receiving means increases. In other manner, the threshold value is set to be relatively large for signals corresponding to a relatively shorter distance away and the problem of detection error due to weather conditions can be eliminated.

The distance measuring apparatus of the invention may be structured such that the scanning is performed only by the light-transmitting means. In order to improve the distance-measuring capability, however, it is preferable to operate a receiver head comprising the light-receiving means in synchronism with the light-transmitting means for the scanning.

DETAILED DESCRIPTION OF THE INVENTION

Figure 1A:
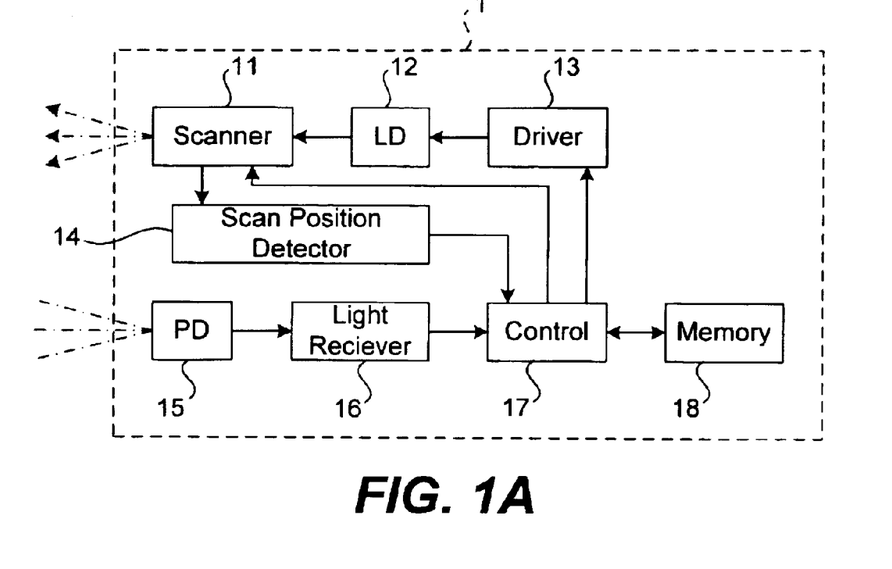
FIG. 1A is a block diagram of a distance measuring apparatus embodying this invention and FIG. 1B is a drawing for explaining the structure of its detection area.

The invention is described next by way of an example. FIG. 1A shows a pulse echo type laser radar 1, as an example of distance measuring apparatus embodying this invention, comprising a scanner 11, a laser diode (LD) 12, a driver circuit 13, a scan position detector 14, a photodiode (PD) 15, a light-receiving circuit 16, a control circuit 17 and a memory 18. The control circuit 17 corresponds to what are also referred to below as "area-combining means" and "judging means". Similarly, the scanner 11, the laser diode 12 and the driver circuit 13 correspond to what is referred to below as "light-transmitting means" and the photodiode 15 an to what is referred to below as "light-receiving means". The photodiode 15 and an associated optical system (not shown) are also referred to as "receiver head".

The scanner 11 serves to direct the laser light outputted from the laser diode 12 by using a swinging reflective mirror or the like to reciprocatingly change its left-right direction at a specified timing and period within a specified angular range (also referred to as the "scan area"), being controlled by the control circuit 17. The scanner 11 may operate at a constant scan speed, and its scan area is usually set somewhat wider than the detection area in which measurements are to be taken.

The driver circuit 13 is also controlled by the control circuit 17 and serves to drive the laser diode 12 at a light-emission timing generated by the control circuit 17 to output a laser pulse. The light-emission timing is preliminarily set such that emission and reception of light will take place at least once inside each "standard area" to be described below. The light emission may be at a constant rate.

The scan position detector 14 is an element for detecting the direction of scan by the scanner 11 and transmitting to the control circuit 17 a signal ("scan-direction signal") indicative of the detected direction of scan.

The photodiode 15 is for receiving the laser light reflected by a target object for detection and serves to output an electrical signal (the "light-intensity signal") corresponding to the intensity of the received light. The light-intensity signal outputted from the photodiode 15 is inputted to and processed by the light-receiving circuit 16 and the control circuit 17. For example, the light-intensity signal may be received at a sampling frequency corresponding to the aforementioned light-emission timing only during a specified time period after the laser light is transmitted so as to generate data ("received waveform data") on the intensity of the received light as a function of time as shown in FIG. 2. If the laser light is transmitted and received more than once within a standard area (to be explained below), that is, if there are a plurality of waveform data corresponding to one standard area, these received waveform data are cumulatively added for each standard area and stored in the memory 18 as data on the received light for each standard area. The control circuit 17 also serves to generate "combined areas" each comprising one or more standard areas and having the added received waveform data of these standard areas as its own received waveform data item and judges the presence or absence of a target object for detection based on these data associated with the combined areas and, if present, its position according to these data (to be described in detail below).

The detection sensitivity in each standard area depends heavily on the number of times the laser light is transmitted to and received from that standard area (or the detection frequency). Thus, this number should be determined based on conditions such as the power of transmitted light, the spread angle extended by the transmitted beam and the reflectivity of the target object for detection such that the detection can be made dependably. According to this invention, the detection sensitivity is adjusted by combining the standard areas according to the conditions of received signals and hence the number of detections per standard area may be constant.

Figure 1B:
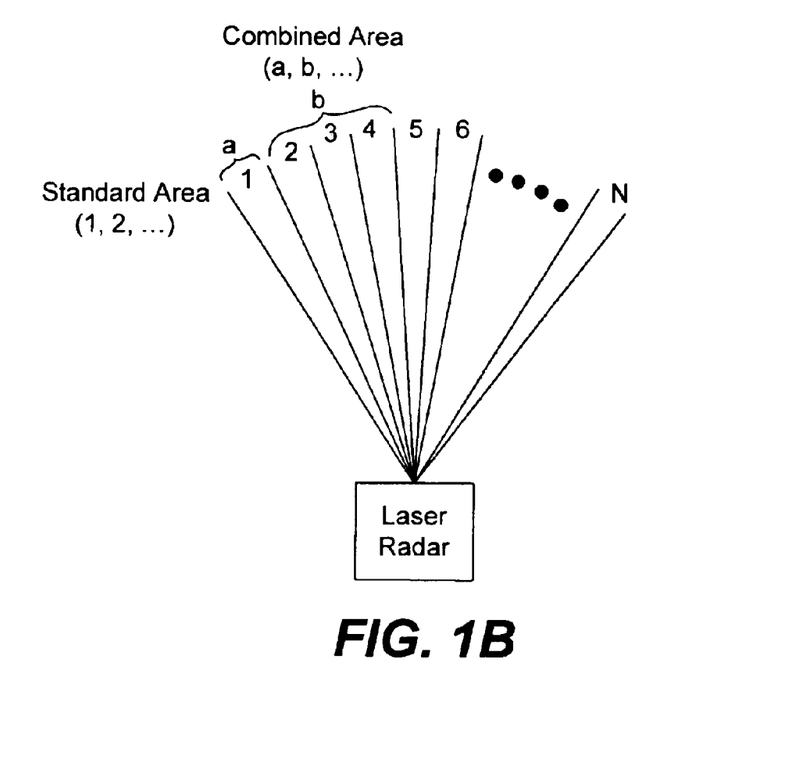

The aforementioned standard areas are formed, as shown in FIG. 1B, by partitioning the scan area in the (left-right) direction of the scan at a constant (angular) width. For convenience, FIG. 1B shows the standard areas indicated by numerals "1", "2", etc. Combined areas each comprising at least one of the standard areas are indicated by letters "a", "b", etc. The width and the total number N of the standard areas are kept constant as determined preliminarily but the widths and the total number of the combined areas may be changed for each scan.

Let us assume that received waveform data as shown in FIGS. 2A, 2B, 2C and 2D have been obtained respectively from standard areas "1", "2", "3" and "4" of FIG. 1B. The received waveform data from standard area "1" shown in FIG. 2A indicate that the intensity of the received light exceeds a threshold value Th at time Ta, and this means that the received light is of sufficient intensity for the purpose of detection. Thus, the first of the combined areas (combined area "a") consists only of standard area "1" and the received waveform data for standard area "1" is directly inherited as the received waveform data for combined area "a". The received waveform data for combined area "a" indicate that a part or the whole of a target object for detection is in the direction of combined area "a" and at a distance that can be calculated from the speed of light and time Ta ("delayed propagation time").

Figure 2A:
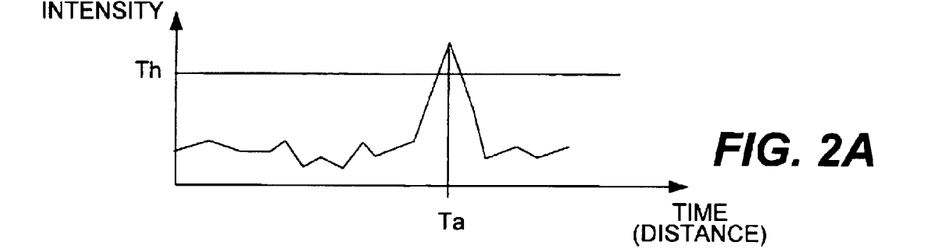
FIGS. 2A, 2B, 2C, 2D and 2E, together referred to as FIG. 2, are drawings for showing examples of received waveform data.
Figure 2B:
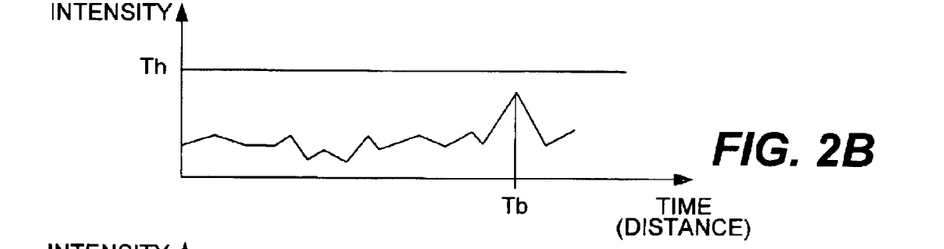
Figure 2C:
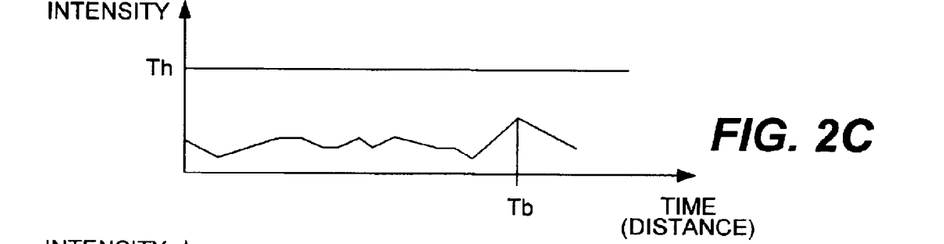
Figure 2D:
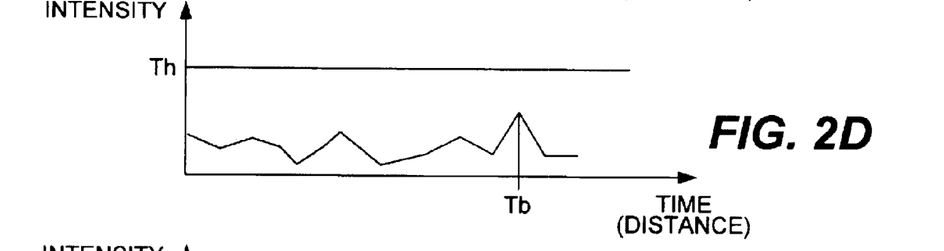
Figure 2E:
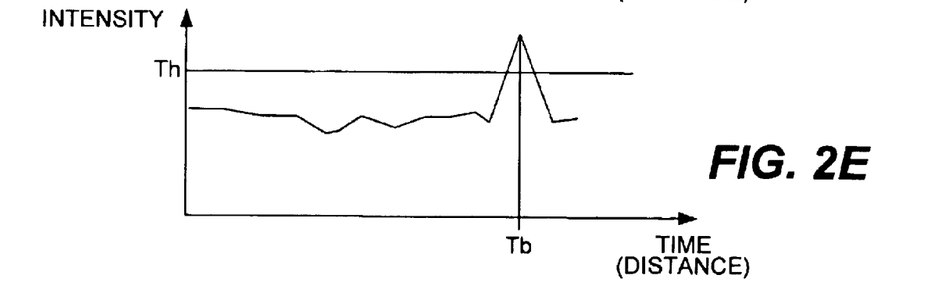

The received waveform data for standard areas "2", "3" and "4" shown in FIGS. 2B, 2C and 2D, by contrast, each have a maximum at time Tb but the intensity values do not exceed the threshold value Th. This means that there is a high probability that a target object for detection is at a distance corresponding to the delay time of Tb but is not detectable because the light intensity is made weaker due to weather conditions or the surface condition of the target object. In this case, the control circuit 17 serves to cumulatively add the received waveform data of standard areas "2", "3" and "4" and to create combined area "b" from these standard areas "2", "3" and "4", having this cumulatively added result as its waveform data. Judgment as to the presence or absence of a target object and determination of its position (direction and distance) are made on the basis of data related to combination area "b", not on the basis of individual data related to standard areas "2", "3" and "4". The cumulatively added received waveform data are shown in FIG. 2E. Its S/N ratio is improved by the integration, and there is a high probability that the result of this cumulative addition has a peak at Tb that exceeds the threshold value Th. If the result of this cumulative addition actually exceeds the threshold value Th at Tb, as shown in FIG. 2E, it can be concluded that a part or the whole of a target object for detection is present in the direction of combined area "b" and at a distance obtained from the speed of light and the delay time Tb.

If the threshold value Th is exceeded by cumulatively adding data over only standard areas "2" and "3", combined area "b" is created only from standard areas "2" and "3". If the threshold value Th is not exceed after the cumulative addition is made over standard areas "2", "3" and "4", the addition is further continued sequentially over standard areas "5", "6", . . . until the number of standard areas over which the cumulative addition has been made reaches a specified upper limit number. If the threshold value Th is not exceeded even after the upper limit number is reached, it is concluded that there is no target object for detection in this combined area (consisting of this upper limit number of standard areas). If the single standard area next after a standard area or a combined area not exceeding the threshold value Th is found to exceed the threshold value Th, the cumulative addition is stopped immediately before this next standard area and it is concluded that there is no target object for detection in the standard or combined area before the next standard area although the number of times of the cumulative addition may not have reached the aforementioned upper limit number.

Thus, combined areas each consisting of one or more standard areas are created within the scan area for each scan and determinations are made as to the presence or absence and the position of a target object for detection on the basis of the data from these combined areas. If the conditions are favorable and the intensity of reflected waves is sufficiently high, the numbers of standard areas in the combined areas become smaller (and the number of the combined areas increases) such that the resolution in the horizontal direction becomes higher. If the weather and other conditions are adverse and the intensity of reflected waves is not sufficiently high, the numbers of standard areas in the combined areas become larger (and the number of combined areas decreases) such that the resolution in the horizontal direction becomes accordingly lower but the actual detection sensitivity is increased so as to prevent the detection capability from adversely affected.

The control circuit 17 carries out the cumulative addition over standard areas and combines them unconditionally if their data do not exceed the threshold value although they may not have a maximum at the same time (distance) such as shown in FIGS. 2B, 2C and 2D. In other words, the cumulative addition is carried out independently of whether a target object for detection is actually present or not.

When waveform data are cumulatively added as described above, the noise component increases generally as the square root of the number of times the addition is made and hence much more slowly than the signal component, or the reflected wave component. Thus, the same threshold value Th may be used for analyzing the cumulatively added data as when no cumulative addition is made. In other words, although a fixed threshold value Th is used, the noise component may not increase enough by the cumulative addition to exceed the threshold value, for example, if the basic S/N ratio is high and the threshold value Th is set somewhat higher with a room to spare. It is preferable, however, to make the threshold value variable according to the condition of the received signal and to set an optimal threshold value each time (as will be explained in detail below). It is also desirable that the threshold value Th should be time-dependent so as to be lower as the delayed transmission time becomes longer (as will also be explained below).

The aforementioned upper limit number for the cumulative addition (or the number of standard areas that may be combined) is selected according to the size of the target object for detection in the direction of the scan such that the width of the combined area will not be unnecessarily large. In the case of laser radar for an automobile, a number of standard areas corresponding to the width of a large automobile 20 m away may be selected as the upper limit value. If the width of such a "large automobile" is supposed to be 2.5 m, the scan angle for it at 20 m is 7.13° and if the width of the standard area is 1°, the upper limit number for the cumulative addition be set equal to 8.

The control circuit 17 includes a microcomputer with a CPU, a ROM and a RAM and serves to create combined areas, say, by way of a program to be explained below with reference to the flowchart shown in FIG. 3 and to determine the presence/absence of a target object for detection as well as its position. This process is repeated at a frequency corresponding to the frequency of the scan by the laser light. It may be carried out on real time while the detection area is being scanned.

As the process is started, necessary data are retrieved from the memory 18 and the received waveform data of the next standard area is evaluated (or compared with the threshold value Th) (Step S1). In the above, the "next standard area" means the standard area at the beginning among the standard areas where data have not been evaluated yet. When this program is initially started, this may be the first of the standard areas such as the one indicated by "1" in FIG. 1B. The next time Step S1 is carried out next, it will be standard area "2".

It is determined from the evaluation in Step S1 whether or not the waveform data include any portion where the intensity exceeds the threshold value Th (Step S2). If there is such a portion (YES in Step S2), the corresponding standard area is treated as one combined area where a target object is detected, and the routine proceeds to Step S4.

In Step S4, if there are temporarily stored left-over data related to cumulative addition ("temporary data"), the memory area for such temporary data is reset to zero and the process proceeds to Step S7. Step S7 and subsequent Step S11 are not carried out for the standard area or areas corresponding to the data thus erased and it is concluded that there is no target object there.

In Step S7, target data are calculated from the data on the corresponding combined area. If Step S7 is carried out after Step S4, the "corresponding combine area" is the one consisting of only one standard area where the waveform data were evaluated in Step S1. If Step S7 is carried out after Step S6, the "corresponding combined area" consists of the plurality of standard areas evaluated in Step S5 to be explained below. The "target data" in the above means the data related to the size and the position of the target object for detection such as its distance, width and direction that are to be finally outputted from the distance measuring apparatus. The distance can be calculated from the aforementioned delayed propagation time (elapsed between the time of light emission and the time of receiving the reflected waves) determined from the time at which the received waveform data exceed the threshold value Th by multiplying it with the speed of light. The width (or the length in the direction of the scan) can be calculated by triangulation from the angular widths of the corresponding combined areas and the distance. The direction can be determined from the angular position of the corresponding combined areas within the detection area. The intensity of the reflected waves exceeding the threshold value Th may be included in the target data because this may be used to calculate the reflectivity of the target object for detection and its type may be identified from its reflectivity, After Step S7 is completed, the width (W) obtained in Step S7 is compared with a preselected upper limit value (LIM) such as a value corresponding to one traffic lane on the road (Step S9). If the width W is less than this upper limit value LIM (NO in Step S9), the target data obtained in Step S7 are registered (Step S11), say, in the memory 18. If the width W is greater than the upper limit value LIM (YES in Step S9), the program proceeds directly to Step S12.

The purpose of Step S9 is to treat the target data obtained in Step S7 as being meaningless and to discard them without registering if the relationship between the result of calculation in Step S7 and the widths of the combined areas is not rational. Assume, for example, that each standard area is 1° in width and a combined area consisting of three standard areas has been created (such as combined area "b" of FIG. 1B). If the target data indicate a distance of 100 m, the angular width of the combined area is 3° and the corresponding dimension at 100 m is about 5.2 m, which is far greater than the width of a normal traffic lane, indicating that there is a high probability that a plurality of vehicles or a vehicle on a lane in the opposite direction is included. In such a situation, Step S9 serves to disregard the obtained target data and it is concluded that there is no target object for detection in the corresponding combined area.

If the calculated distance is small such as 10 m, on the other hand, it is possible to increase the number of standard areas for creating one combined area. Even if the angular width of a combined area is as large as 10°, the corresponding dimension at 10 m is about 1.7 m, and it may be believed that all of the ten standard areas of the combined area are indicating one vehicle and the target data should be considered valid.

If it is determined in Step S2 that the waveform data corresponding to the standard area under consideration do not exceed the threshold value Th (NO in Step S2), waveform data of a plurality of standard areas are cumulatively added, the sum being temporarily stored as "temporary data" (Step S3). The waveform corresponding to the temporary data is evaluated (Step S5), and if it is found to have a portion exceeding the threshold value Th (YES in Step S6), the process proceeds to Step S7 as explained above. In this case, the plurality of standard areas corresponding to the temporary data evaluated in Step S5 become a combined area on the basis of which target data are calculated. Although not shown in FIG. 3, the memory space which has been used to store the temporary data is reset to zero so as to be ready for the processes of Steps S1 and S2 in the next cycle.

If the waveform evaluated in Step S5 does no exceed the threshold value Th anywhere (NO in Step S6), the number of times the cumulative addition has been performed, or the number of standard areas combined so far, is compared with the aforementioned upper limit (Step S8). If the upper limit has been reached (YES in Step S8), the area for the temporary data is reset to zero and it is concluded that there is no target object for detection in the corresponding standard area. Steps S7 and S11 are accordingly not carried out for this standard area.

If the upper limit has not been reached yet (NO in Step S8) and after Step S10 has been carried out, it is checked whether the standard area for which the waveform was evaluated in Step S5 was the last of the standard areas such as area N shown in FIG. 1B (Step S12). If it was not the last area (NO in Step S12), the process is repeated for the next standard area. If the last standard area has been evaluated (YES in Step S12), this is the end of one measurement cycle.

To summarize the operations of Steps S1–S12, if the signal from one standard area has a waveform with a portion exceeding the threshold value Th, this signal is considered as the signal from one combined area. If the signal waveform from one standard area does not exceed the threshold value Th but if the signal waveform from the next standard area in the direction of scan does, these signals are treated as signals from two separate combined areas. If the signal waveform from one standard area does not exceed the threshold value Th and neither does that of the next standard area in the direction of scan, the signals received in these two standard areas are cumulatively added and this added result is treated as the signal from the combined area consisting of both of these standard areas. If the signal waveform of this combined area does not exceed the threshold value Th and neither does that of the next standard area in the direction of the scan (or the third standard area in a row), the signals from these three standard areas are cumulatively added and the result of this cumulative addition is treated as the signal corresponding to this newly formed single combined area consisting of three standard areas. The number of standard areas to be combined to make a single combined area is thereafter sequentially increased as long as its cumulatively added signal waveform does not exceed the threshold value Th and the number of combined standard areas does not exceed a specified upper limit value. The data from such a combined area are used as target data for determining the presence or absence of a target object for detection as well as its position.

Even in the case where the signal waveform from a combined area thus formed exceeds the threshold value Th, if the size of the target object for detection estimated from the calculation results and the width of the corresponding combined area is too much larger than it realistically can be, the result of detection is considered invalid and it is concluded that there is no target object for detection at the corresponding position, as explained above with reference to Step S9 of FIG. 3.

Distance measuring apparatus to be installed on an automobile may be further provided with various post-treatment functions. Examples of such post-treatment function includes the function of determining the total size of the target object for detection by grouping data and establishing an orthogonal coordinate system on the basis of the target data described above, the type of the target object such as if it is a vehicle, an obstruction or a reflector on the roadside, or its position such as the traffic lane in which an automobile in front is traveling, as well as the function of taking into account also of the motion of the automobile on which it is installed to determine the details of the motion of the target object such as whether it is stationary or in motion and what the relative speed is, creating data necessary for a system for monitoring the obstacles in front or for controlling one's own speed so as to follow the automobile in front by a constant distance in between. Explanation of such post-treatment functions will not be presented herein.

Reflected light may not always be received all at once. Since the emitted light beam has a finite angular spread, reflected light may be received at different timings and with subtly different intensities. Devices of the kind of this invention are frequently adapted to carry out an averaging process over the received waveform data exceeding a threshold value, say, by calculating the center of gravity of several points near where the intensity of received light has a local maximum, in order to obtain the value of the delayed propagation time. A similar function may be provided to an apparatus of this invention.

Many desirable effects can be attained by a distance measuring apparatus according to this invention as explained above. In a situation where there is a continuous row of standard areas in which there is a component of reflected waves and which should normally output a signal with waveform having a portion exceeding the threshold value but of which the signal waveform fails to exceed it because of the weather condition or the surface condition of the target object for detection, the control circuit 17 carries out cumulative addition of received signal data such that the reflected wave portions with the noise component removed are increased and the actual detection sensitivity is improved although the resolving power is accordingly lowered. As a result, the adverse effect of weather condition and the surface condition of the target object for detection on the detection sensitivity can be eliminated. Moreover, separate means for detecting the weather condition are not required and hence the apparatus according to this invention is not complicated, unlike the prior art apparatus described above. If the standard areas are made sufficiently narrow, the resolving power may be kept high when the weather condition is favorable so as to aid in determining the traffic lane for the automobile in front. A device according to aforementioned Japanese Patent Publication Tokkai 10-197635 is adapted to change the speed of scan by the laser light or the frequency of light emission in order to vary the laser light detection time and hence the mechanism for scanning the laser light and controlling the light-emitting element became complicated. According to the present invention, by contrast, the speed of scan and the light emission frequency need not be varied and hence no complicated mechanism is necessary.

Since the cumulative addition according to this invention is continued by sequentially increasing the number of standard areas to be combined into a single combined area as long as the cumulatively added received signal has a waveform not exceeding the threshold value, furthermore, the number of standard areas to be combined changes continuously, depending on the weather and other environmental conditions. In other words, the detection sensitivity of detection as well as the resolving power in the direction of scan can be finely and automatically adjusted. Since an upper limit value is preliminarily set for the number of standard areas that can be combined, the possibility of uselessly continuing to increase the number of standard areas while there is no target object can be avoided.

Next, examples wherein the threshold value is made variable will be explained. There are basically three ways of varying the threshold value according to the condition of the received signals. One is to change it according to the number of times the cumulative addition is carried out, or the number of standard areas to be combined. Another is to set a new threshold value each time on the basis of the received waveform data to be examined. The third is to set the threshold value appropriately on the basis of the waveform data when light is not being emitted.

One method of the first type is to increase the threshold value proportionally to the square root of the number of times of the cumulative addition. As explained above, the noise component increases as the cumulative addition is repeated but this increase is proportional to the square root of the number of times of cumulative addition. Thus, if the threshold value is increased in this manner, the detection capability can be maintained at a high level and the noise component can be more reliably prevented from increasing disproportionately and exceeding the threshold value.

According to an example of the method of the second type, the time-average of the received waveform data may be multiplied by a predetermined correction factor or a predetermined constant correction term is added to it to obtain a threshold value each time the received waveform data are evaluated. The values of these correction factor and term may be preliminarily determined experimentally by taking into consideration factors such as the variations of the noise component. Alternatively, these values may be changed each time by taking into consideration factors such as the variations (or the standard deviation) of the received waveform data.

If the threshold value is thus determined, it increases as the intensity of the noise component increases and errors in the judgment due to the noise component can be avoided. If a target object for detection is present and its reflectivity is high, the average of received light intensity increases and the threshold becomes higher but the detection capability can be maintained at a high level since the intensity of the received light from the target object has a sharp peak.

According to a method of the third type, received waveform data when light is not being transmitted are measured for each frame (or for each cycle of measurement) and a time-average of the measured data or the data taken at a specified time is multiplied by a predetermined correction factor or a predetermined correction term is added to it. As explained above regarding a method of the second type, these correction factor and term may be predetermined experimentally or may be changed each time, depending on the variations (or the standard deviation) of the received waveform data. By methods of the third type, too, effects that can be obtained by methods of the second type can be obtained. Since received waveform data when there is no light transmission contains only the noise component, effects of changes in the noise component can be more effectively absorbed and a more appropriate threshold value can be set and detection errors due to noise component can be prevented more reliably.

Figure 4A:
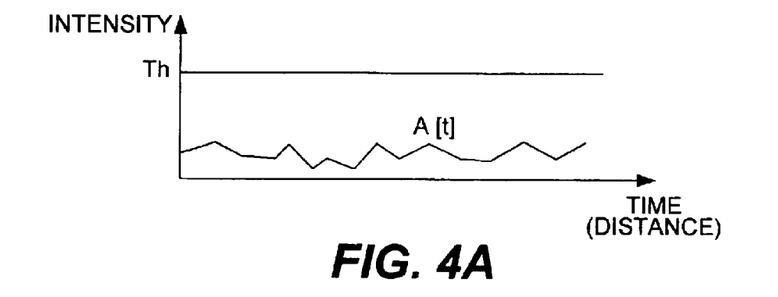
FIGS. 4A, 4B and 4C, together referred to as FIG. 4, are drawings for showing the manner and effect of varying the threshold value.

Next, a method of the third type is explained more in detail. Let us assume that the received waveform data at a time when there is no light emission look as shown in FIG.

4A, having only noise components. Let A(t) denote the intensity of the received light at time t and M represent the number of data along the time-axis. Then, the threshold value Th may be defined as follows:

$$Th=Ave+3\sigma$$

where $Ave=(\Sigma A(t))/M$ is the time average of the intensity of the received light and $\sigma$ is the standard deviation $(=((\Sigma(A(t))^2)/M-(Ave)^2)^{1/2})$. Thus, if the generated noise has a normal distribution, 99.7% of the noise should theoretically be below the threshold value Th thus determined and an error caused by noise can be prevented with a very high level of reliability. If the noise does not have the normal distribution or if the remaining 0.3% should be eliminated, the threshold value Th may be determined as $Th=Ave+4\sigma$ or $Th=Ave+3\sigma+\alpha$ where $\alpha$ is a correction term which may be experimentally determined.

Figure 4B:
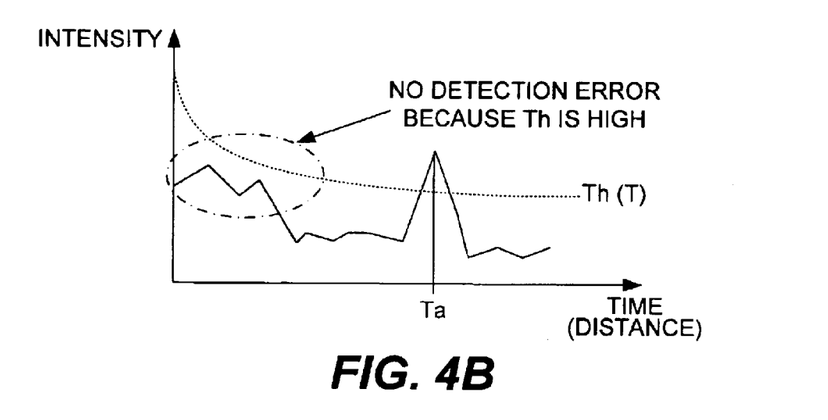
Figure 4C:
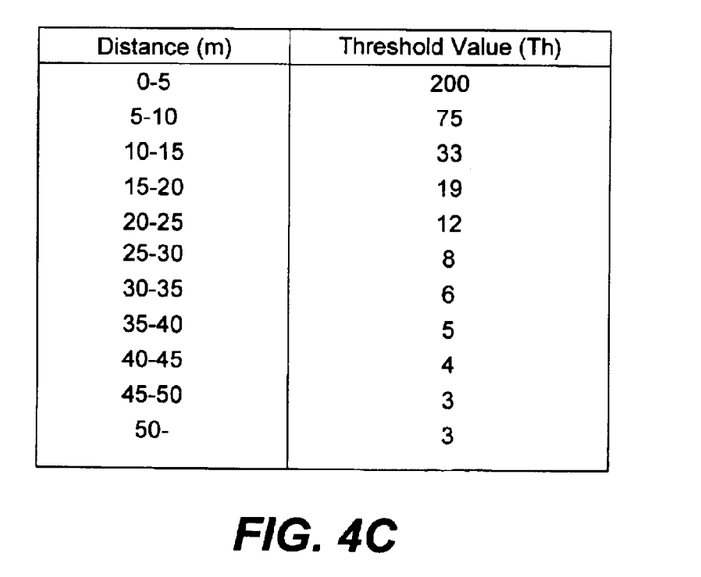

Next will be explained an example where the threshold value Th is made time-dependent, or variable along the time-axis. Since reflected waves from a short distance naturally have higher detection sensitivity, the probability of erroneously detecting a non-existing object as being present because of the weather condition is higher from waves from a shorter distance. So, the threshold value Th may be made variable as shown in FIG. 4B, higher at shorter distances and shorter delayed propagation times and diminishing at longer distances and longer delayed propagation times. Such a time-dependent threshold value Th may be prepared as a function of time or a table may be prepared as shown in FIG. 4C. Since the intensity of reflected waves varies inversely proportional to the square of distance, the table may be prepared according to this theoretical relationship but it may also be prepared experimentally. FIG. 4C is an example wherein the light intensity (A/D value) is set as an 8-bit number (0–255). With the threshold value Th thus made variable, the problem of detection errors at short distances can be eliminated and an improved overall detection sensitivity can be obtained.

Figure 5:
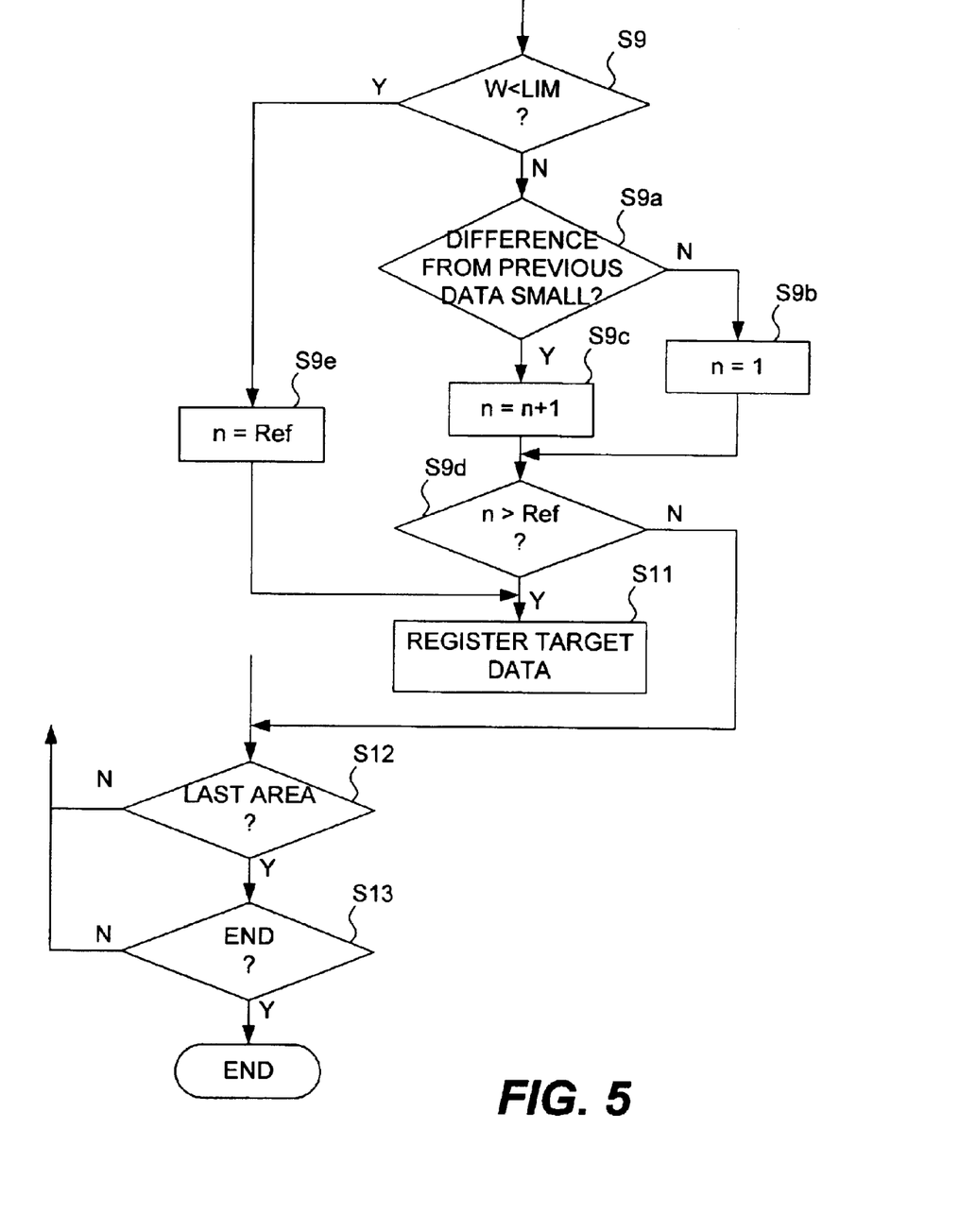
FIG. 5 is a portion of a flowchart for a variation of the process shown by the flowchart of FIG. 3.

FIG. 5 is referenced next to explain an example wherein target data are not necessarily invalidated and discarded when their width exceeds an upper limit value. According to the processing described above with reference to the flowchart of FIG. 3, target data were considered invalid and discarded in Step S9 if the width of the target data exceeds a predetermined upper limit. This, however, gives rise to the possibility that an actually existing target object for detection may be detected in a combined area which has been made wider as an effect of the spread of the projected beam of light and hence the corresponding target data may be considered invalid and discarded. The flowchart of FIG. 3 may therefore be modified in view of such a possibility. FIG. 5 therefore shows only a portion of the flowchart of FIG. 3 where additional steps are introduced according to this example.

Figure 3:
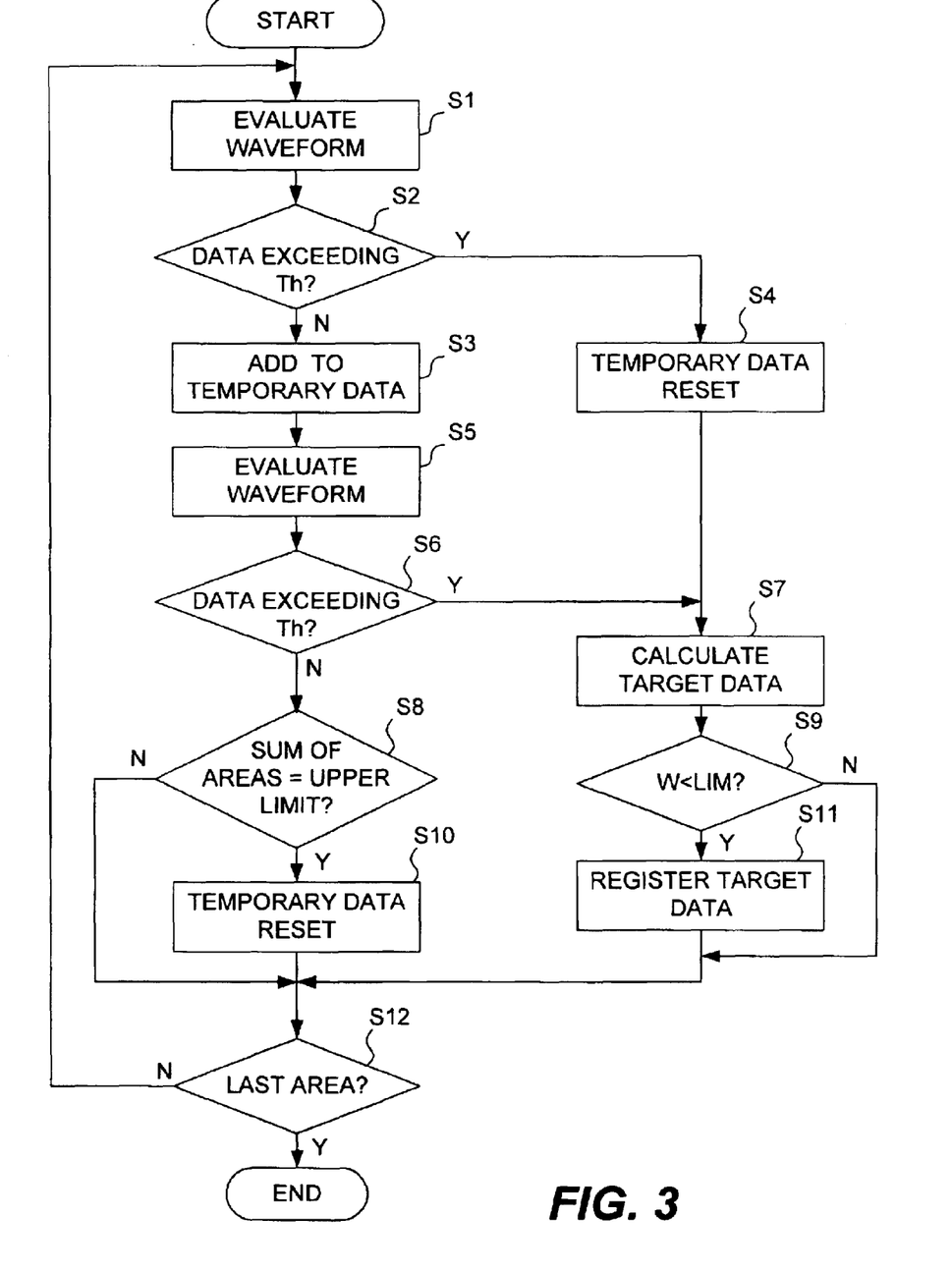
FIG. 3 is a flowchart for the process of creating combined areas and detecting a target object.

If the width of the target data is exceeding the upper limit in Step S9 of FIG. 3 (and hence of FIG. 5) (NO in Step S9), data on the distance, width and direction are compared with the target data of the previous frame (Step 9a). If the differences in all data are smaller than preliminarily selected values (YES in Step S9a), it is concluded that the same target object for detection is caught sight of and the number n of a counter is incremented (Step S9c). If the difference in any of the data on the distance, width and direction is less than the corresponding selected values (NO in Step S9a), it is concluded that a different target object for detection has been sighted and the counter n is set equal to 1 (Step S9b). If the counter n is set equal to 1 (NO in Step S9d), the target data at that moment are not registered (not through Step S11) and Steps S9a and S9d are repeated for the next frame. If there were no target data in the previous frame, the counter is also set equal to 1 (Step S9b). The values used for the determination in Step S9a may be selected to be 2 m for distance, 1° for direction and 1 m for width in the case of an apparatus installed on an automobile.

After Step S9b or Step S9c has been carried out, the counter n at that moment is compared with a preselected reference value Ref (Step S9d) in order to check the time duration over which the same target object for detection has been continuously detected. If the counter n is greater than this reference value Ref (Yes in Step S9d), the target data are considered valid and registered (Step S11). The reference value Ref may be selected (say, 1 second) on the basis of the period for the processing of one frame. If the period for the processing is 0.1 second, the reference value Ref may be set equal to 10.

If the width of the target data is not exceeding the selected upper limit in Step S9 (YES in Step S9), the counter n is set equal to the reference value Ref (Step S9e). Thus, at the moment when the response in Step S9 changes from YES to NO as the target object is slowly moving away, the counter does not have to start counting from 1 but a comparison is made with the previous frame and if the response in Step S9a is YES, the target data can continue to be registered and the target object can be detected continuously.

With reference to FIGS. 3 and 5, Steps S11–S12 represent processes for one frame and are repeated as long as a command (the END command) is not received, say, from a host system, to end the process (Step S13).

Although FIG. 5 was explained above for a case where only one target data item is considered, a plurality of data items may be considered for each frame. In such an application, data on a plurality of counters as well as a plurality of data on distance, direction and width must be stored and a plurality of counters may have to be incremented if conditions are met as comparisons are made with data of the previous frame. The data to be compared in Step S9 may relate to distance, width and/or direction.

Further modifications and variations are possible within the scope of this invention. For example, the cumulative addition of data may be started only after three or more standard areas in a row with data not exceeding the target value. As another example, the number of standard areas in cumulative addition of data need not be increased by one at a time. Different manners of varying the threshold value have already been disclosed, but these manners may be combined. For example, a change may be made not only in the direction of the time-axis but also in the direction of the intensity of the received light, depending on the condition of the received light. This will correspond to moving the graph of threshold value Th(t) shown in FIG. 4B upward and downward according to the condition of the received light signal.

Moreover, the start of a cumulative addition of data may be on the condition that received waveform data of standard areas should each have a maximum at a nearly same time, suggesting that a target object for detection may be at a corresponding distance. The direction of scan need not be limited to be horizontal. The scan may be effected in the vertical direction or in a rotary fashion. It may be effected by sliding the light emitting device.

In summary, when signals exceeding a threshold value are not obtained from a plurality of standard areas, these signals are cumulatively added and a single combined area is created having the added signals as its signal. Presence or absence of a target object for detection as well as its position data are obtained on the basis of such added data. As a result, even if the weather and other conditions cause the signals from individual standard areas to fail to exceed the threshold value, the reflected portion of the light after the noise is eliminated increases and the actual detection sensitivity is automatically improved although the resolving power is diminished. Accordingly, adverse effects of weather and other environmental conditions on the detection capability of the detection apparatus can be prevented.

What is claimed is:

1. A distant measuring apparatus comprising:

light-transmitting means for transmitting electromagnetic waves to scan in a specified scan direction a specified detection area which is partitioned into a plurality of standard areas of a fixed width;

light-receiving means for receiving reflection of said electromagnetic waves transmitted from said light-transmitting means and reflected by a target object in said detection area;

memory means for storing signals from said light-receiving means individually corresponding to said standard areas;

area-combining means for carrying out cumulative addition of the signals stored in said memory means corresponding to a set of those of said standard areas which are mutually adjacent in said scan direction to obtain a combined signal associated with a single combined area consisting of said set of standard areas if the signals corresponding to said set of standard areas do not exceed a threshold value, those of said standard areas, the signals from which are not cumulatively added, being each defined as a different one of combined areas and the signals therefrom being each defined as a different combined signal associated therewith; and judging means for judging presence and position of a target object from the combined signals from the combined areas obtained by said area-combining means.

2. The distance measuring apparatus of claim 1 wherein, if neither added result over a set of mutually adjacent ones of standard areas nor the signal from the next one of the standard areas after said set of standard areas in said scan direction exceeds said threshold value, said area-combining means repeats the cumulative addition including the signal from the next standard area and includes the next standard area in the single combined area corresponding to said set of standard areas, thereby sequentially increasing the number of standard areas combined in said single combined area.

3. The distance measuring apparatus of claim 2 wherein, if said cumulative addition has been repeated and the number of standard areas combined in said cumulative addition has reached a specified upper limit number but if the combined signal does not exceed said threshold value, said area-combining means defines said upper limit number of combined standard areas as one combined area.

4. The distance measuring apparatus of claim 1 wherein said judgment means invalidates judgment result corresponding to a combined area if the size of said target object in said scan direction estimated from the width of said combined area is considered abnormally large according to a specified criterion and concludes that there is no target object for detection in said combined area although the signal corresponding to said combined area exceeds said threshold value.

5. The distance measuring apparatus of claim 1 wherein said judgment means validates judgment result thereby corresponding to a combined area in a situation where the signal corresponding to said combined area exceeds said threshold value, the size of said target object in said scan direction estimated from the width of said combined area is considered abnormally large according to a specified criterion, if time rate change of the size of said target object estimated by said judgment means remains smaller than a specified maximum value over a specified length of time, said judgment means invalidating judgment result thereby if otherwise.

6. The distance measuring apparatus of claim 1 wherein said judgment means validates judgment result thereby corresponding to a combined area in a situation where the signal corresponding to said combined area exceeds said threshold value, the size of said target object in said scan direction estimated from the width of said combined area is considered abnormally large according to a specified criterion, if time rate change of the position of said target object estimated by said judgment means remains smaller than a specified maximum value over a specified length of time, said judgment means invalidating judgment result thereby if otherwise.

7. The distance measuring apparatus of claim 1 wherein said threshold value is set according to a time average of those of said signals on which said judging means judges said target object.

8. The distance measuring apparatus of claim 1 wherein said threshold value is set according to those of said signals received while said electromagnetic waves are not being transmitted.

9. The distance measuring apparatus of claim 1 wherein said threshold value is set to be time-dependent, decreasing as the delay time increases until said electromagnetic waves are received by said light-receiving means.

* * * * *